United States Patent Office 3,084,139
Patented Apr. 2, 1963

3,084,139
THERMOSETTING COATING COMPOSITIONS COMPRISING EPOXY AMINE RESINS AND TRIACRYLYL - HEXAHYDRO - s - TRIAZINE ADDUCTS
Charles L. Hamermesh, Canoga Park, Calif., assignor to Interchemical Corporation, New York, N.Y., a corporation of Ohio
No Drawing. Filed Apr. 8, 1960, Ser. No. 20,819
2 Claims. (Cl. 260—47)

This invention is directed to a novel thermosetting coating composition which yields a hard, well cured, flexible coating displaying excellent adhesion to metal surfaces and therefor very desirable in metal decorating. More particularly, this invention relates to a blend containing polymers which have functional groups with active hydrogen such as amino, carboxyl and hydroxyl groups and 1,3,5-triacrylyl-s-triazine adducts which are stable at ambient storage temperatures but decompose upon curing to yield 1,3,5-triacrylyl-s-triazine, a powerful crosslinking agent.

U.S. Patent No. 2,744,035 discloses textile decorating compositions which comprise aqueous solutions of epoxy amine resins of the type described in U.S. Patent Number 2,772,248 which resins are the reaction products of resinous epoxides with amines containing two or more amino nitrogens having active hydrogen and hexahydro-1,3,5-triacrylyl-s-triazine. The resinous epoxides used in this invention are obtained by condensing dihydric phenols with epichlorohydrin; they contain at least one terminal 1,2-epoxide group per molecule. The resinous epoxides that are preferred are those that are commercially available and which are prepared from dihydroxy diphenyl dimethyl methane, especially 4,4'-dihydroxy diphenyl dimethyl methane or commercial mixtures of this 4,4'-isomer with lesser quantities of the 2,2'-isomer and the 4,2'-isomer (i.e. "Bisphenol A"). Those having an epoxide equivalent of 487 to 1775 and having alternating aliphatic chains and aromatic nuclei united through ether oxygen are preferred. Attempts to use similar compositions of epoxy-amine resins and hexahydro-1,3,5-triacrylyl-s-triazine in water and organic solvents in metal decorating and protective compositions were met with little or no success. These failures were primarily due to two factors: (1) While the solids content required for textile printing was quite low, in metal decorative and protective coating processes, the low solubility of hexahydro-1,3,5-triacrylyl-s-triazine in water and organic solvents fell well below the required solubility in order to insure the higher solids content necessary for metal surface coating compositions. (2) The hexahydro-1,3,5-triacrylyl-s-triazine reacts with the "amine-epoxy" compositions as well as with any other polymer containing functional groups with active hydrogen such as amines, carboxyl or hydroxyl before any heat is actually applied causing undesirable gelation under storage conditions.

It has now been found that hexahydro-1,3,5-triacrylyl-s-triazine adducts produced by the addition of monofunctional secondary amines or monofunctional phenols in equivalent amounts across the three double bonds of 1,3,5-triacrylyl-s-triazine decompose upon heating to yield, 1,3,5-triacrylyl-s-triazine which acts as an excellent cross-linking agent for polymers containing functional groups with active hydrogen such as amino, carboxyl and hydroxy groups especially the epoxy-amine resins of the type described in U.S. Patent No. 2,772,248. In addition, the hexahydro-1,3,5-triacrylyl-s-triazine adducts have greatly increased solubility over the triazine in both organic solvents and water thus providing the higher solids content necessary for metal surface coating composition. The novel blend of this invention, therefore, has the storage stability as well as high solids content desirable in metal decorating composition.

Hexahydro-1,3,5-triacrylyl-s-triazine has the following structural formula:

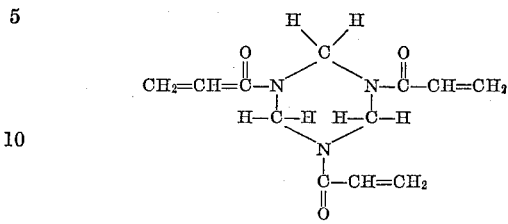

Without any commitment on the theory involved, it is believed that the dialkyl amines, phenol and morpholine react with the triazine at the unsaturated acrylyl double bonds rendering these double bonds unreactive, thus preventing any homopolymerization of the triazines and reaction of any triazine with the "amine-epoxy resins" or any other polymers containing reactive hydrogens which may be blended therewith. This results in increased stability and increased solubility of the hexahydro 1,3,5-triacrylyl-s-triazine. Upon heating during curing, the triazine adducts readily decompose forming the original hexahydro-1,3,5-triacrylyl-s-triazine which then is free to act as a chain linking agent to aid curing of the thermosetting composition involved.

While the ratios of the amines, morpholine or phenol reacted with the hexahydro-1,3,5-triacrylyl-s-triazine is not critical, it will be understood that for best results, at least 3 moles of the former should be reacted with one mole of the latter. The formula readily reveals that each hexahydro-1,3,5-triacrylyl-s-triazine has 3 unsaturated double bonds. 3 moles of amines, morpholine, or phenol are necessary to render these double bonds unreactive. However, even if less than 3 moles are present, there is still a proportional increase in solubility and a decrease in gel point in the crosslinking agent.

The ratios of the crosslinking agent of this invention and the polymers with which it is blended is also not critical. However, it is preferred to have the crosslinking agent constitute from 5% to 20% by weight of the solids in the blend.

It should be noted that while the examples are limited to blends of the triacrylyl-triazine adducts and "amine-epoxy" compounds, blends of the adducts with polymers containing functional groups with active hydrogen such as amines, carboxyl and hydroxyl groups will behave in a similar manner.

The compositions of this invention are soluble in a wide variety of conventional organic solvents including butanol, butyl Carbitol, xylene, ethylene glycol monoethyl ether, and methyl ether of tripropylene glycol.

The following examples will illustrate the practice of this invention:

*Example 1*

To 299 g. (1 mole) of 1,3,5-triacrylyl hexahydro-s-triazine and 1000 g. of chloroform, there is added 219 g. (3 moles) of diethylamine and 219 g. of chloroform dropwise over a period of 1 hour while maintaining the temperature below 55° C. and continually stirring. The reaction is allowed to continue for 2 additional hours. The reaction product is then filtered and stripped of excess chloroform.

*Example 2*

The procedure of Example 1 is repeated using 282 g. (3 moles) of phenol in place of the diethylamine.

*Example 3*

The procedure of Example 1 is repeated using 393 g. (3 moles) of dibutylamine in place of the diethylamine.

Example 4

To 125 g. of 1,3,5-triacrylyl hexahydro-s-triazine, dissolved in 500 g. of chloroform, there is added 195 g. of morpholine dissolved in 200 g. of chloroform dropwise over a period of 1 hour while the temperature is maintained below 40° C. The reaction is allowed to continue for two additional hours. The chloroform is removed by distillation at 120°–130° C. over a period of 2 days.

Example 5

19.4 parts by weight on a solids basis of the product of Example 1 are added to 80.6 parts by weight on a solids basis of an epoxy-amine resin produced by the reaction of 2 moles of an epoxide resin having an average epoxide equivalent of 950 and a melting point of 95–100° C. and 1 mole of triethylene tetramine in accordance with the procedure set forth in U.S. Patent No. 2,772,248 in an ethylene glycol monoethyl ether solvent. This epoxide resin, having the trade name "Epon 1004," is made by reacting "Bisphenol A" with epichlorohydrin. The resulting blend is then roller coated on both black iron and tin plate panels and baked at 204° C. for 15 minutes and at 158° C. for an additional 15 minutes. The resulting films show good fabrication properties, as well as fair resistance to alkaline pasteurization and to steam processing.

Steam processing resistance is determined by contacting the coating with steam at 121° C. Films prepared in the above example withstand 60 minutes' contact showing only slight discontinuity of film or film blush.

Alkaline pasteurization is determined by exposure to an aqueous solution of potassium hydroxide (300 p.p.m. KOH) at 71° C. Films prepared in accordance with the above example withstand 30 minutes exposure without showing any discontinuity of the film or film blush.

By good fabrication resistance it is meant that the flat sheets of tin plate coated with the cured film can be fabricated into can ends without seriously disrupting the film.

Example 6

Example 5 is repeated using the following ingredients.

| | Parts by weight on a solids basis |
|---|---|
| Product of Example 1 | 22.2 |
| The reaction product of 2 moles of an epoxide resin having an epoxide equivalent weight of 492 and a melting point of 64–76° C. and 1 mole of diethylene triamine | 77.8 | in ethylene glycol monoethyl ether solution.

The resulting blend is roller coated on black iron and tinplate in accordance with the procedure set forth in Example 5. The resulting cured film shows a better cure than that of Example 5 as well as good alkaline pasteurization resistance and steam processing resistance.

Example 7

Example 5 is repeated using the following ingredients:

| | Parts by weight on a solids basis |
|---|---|
| Product of Example 1 | 12.4 |
| Reaction product of tetraethylene pentamine and an epoxide resin having an epoxide equivalent weight of 493 and a melting point of 64–76° C. | 87.6 | in ethylene glycol monoethyl ether solution.

The resulting blend is roller coated on black iron and tin plate. It shows properties equivalent to those of the cured films of Example 6.

Example 8

Example 5 is repeated using the identical ingredients and proportions except that the product of Example 2 is used in place of the product of Example 1. The resulting baked panel has properties equivalent to the baked panel of Example 5.

Example 9

Example 5 is repeated using the identical ingredients and proportions except that the product of Example 3 is used in place of the product of Example 1. The resulting baked panel has properties equivalent to the baked panel of Example 5.

Example 10

Example 5 is repeated using the identical ingredients and proportions except that the product of Example 4 is used in place of the product of Example 1. The resulting baked panel has properties similar to the properties of the baked panel of Example 5.

It will be understood that the practice of this invention is not limited to resins described in the specific examples but that various modifications may be made therein without departing from the scope of the invention as it is defined in the appended claims.

What is claimed is:

1. A thermosetting coating composition comprising an organic solvent solution of (A) the reaction product of hexahydro-1,3,5-triacrylyl-s-triazine and a member selected from the group consisting of diethylamine, dibutylamine, phenol and morpholine and (B) the reaction product of an aliphatic polyamine selected from the group consisting of triethylene tetramine, diethylene triamine and tetraethylene pentamine with a resinous epoxide having an epoxide equivalent of 487 to 1775 and at least one 1,2-epoxide group per molecule and having alternating aliphatic chains and aromatic nuclei united through ether oxygen.

2. A thermosetting coating composition comprising an organic solvent solution of (A) the reaction product of hexahydro-1,3,5-triacrylyl-s-triazine and diethylamine and (B) the reaction product of diethylene triamine with a resinous epoxide having an epoxide equivalent of 487 to 1775 and at least one 1,2-epoxide group per molecule and having alternating aliphatic chains and aromatic nuclei united through ether oxygen.

References Cited in the file of this patent

UNITED STATES PATENTS

| 2,723,241 | Groote et al. | Nov. 8, 1955 |
| 2,744,035 | Fierstein et al. | May 1, 1956 |
| 2,930,773 | Renfrew et al. | Mar. 29, 1960 |
| 2,935,488 | Phillips et al. | May 3, 1960 |
| 2,970,972 | Wear et al. | Feb. 7, 1961 |

OTHER REFERENCES

Smolin et al.: "The Chemistry of Heterocyclic Compounds, s-Triazines and Derivatives, Interscience Publishers, Inc., New York, 1959, pages 533 and 535.